Jan. 14, 1930.  T. A. BRYSON  1,743,754
ELECTRIC POWER CONTROL MECHANISM FOR DRIVEN MACHINES
Filed June 17, 1924
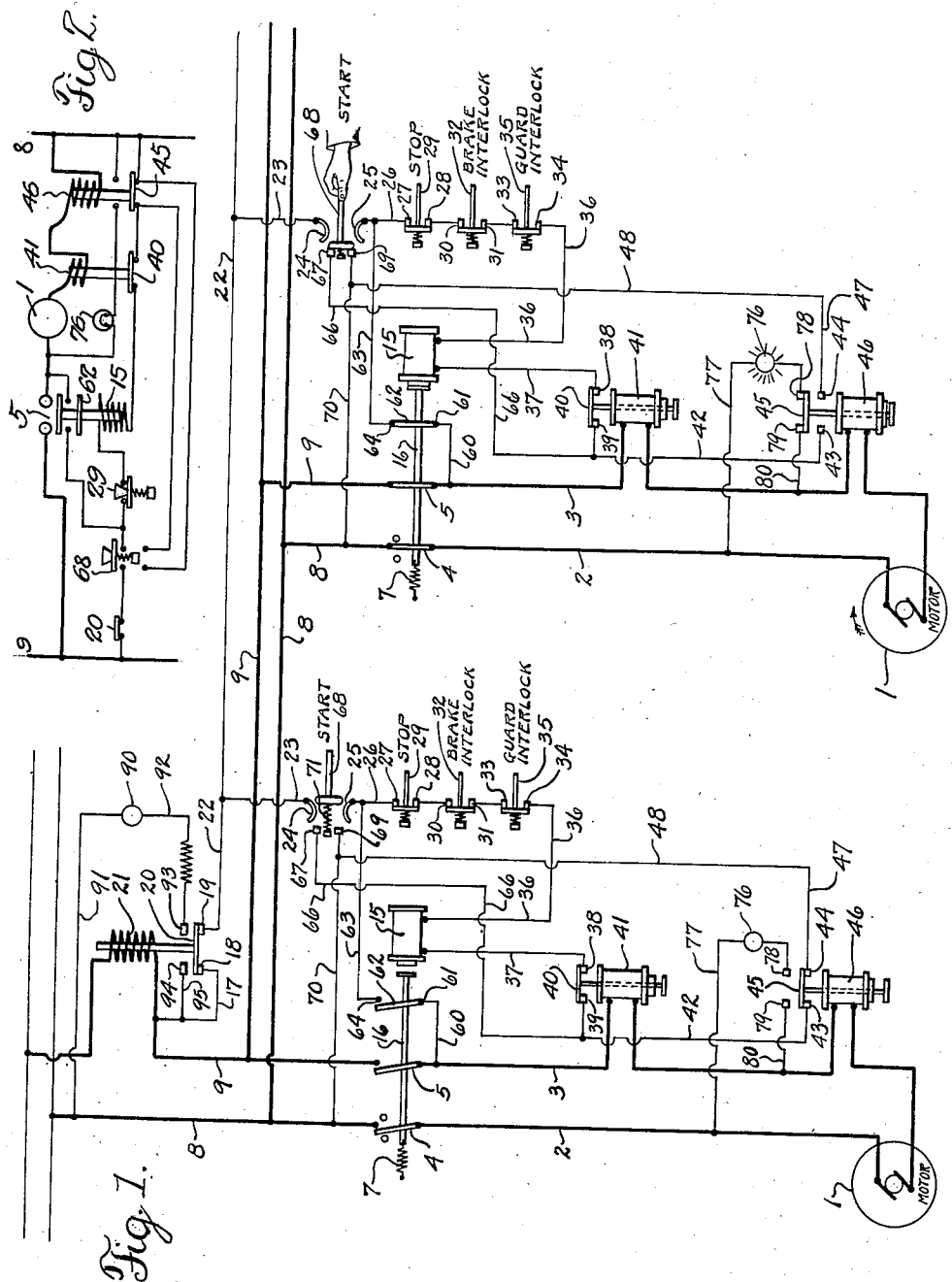
INVENTOR
T. A. Bryson
BY
John D. Morgan
ATTORNEY Patented Jan. 14, 1930

1,743,754

UNITED STATES PATENT OFFICE.

TANDY A. BRYSON, OF TROY, NEW YORK, ASSIGNOR, BY MESNE ASSIGNMENTS, TO TOLHURST MACHINE WORKS, INC., OF TROY, NEW YORK, A CORPORATION OF NEW YORK

ELECTRIC POWER CONTROL MECHANISM FOR DRIVEN MACHINES

Application filed June 17, 1924. Serial No. 720,490.

The invention relates to electric power or current controlling mechanism or devices for driven machines, and more particularly to novel mechanism or devices for controlling the current supply both for starting and for running a machine, and for controlling the starting of the various machines in a battery with respect to each other.

The control system in accordance with this invention includes an electromagnetically operated main switch which is momentarily energized for starting the motor or the like by means of a control switch such as a push button and afterwards maintained energized by the closure of the main switch.

The system also includes a switch which is operated to open position by the starting current until the motor is running under normal load. This latter switch operates to open the energizing circuit for the main switch and at the same time to operate a signal device such as a lamp for indicating the operating condition of the motor; in order, however, to maintain the main switch energized during the starting of the motor the control switch has means associated with it for shunting the latter switch as long as the signal means is operated to indicate that the motor is drawing an excess current in the starting operation. In case a push button control switch (or other switch which normally opens itself except when under manual control) is used it will require an attendant to manually hold the switch closed until the motor is running at normal load.

In connection with a plurality of such individual control systems as briefly outlined above there is a current responsive switch which opens all of the individual control systems upon the starting of one of the motors until the current falls below a predetermined value when it again closes to permit the starting of another motor by the actuation of its control system. This feature however is not claimed in the present application but is subject matter of a divisional application, Serial No. 230,836 filed November 3, 1927.

The objects and advantages of the systems above outlined will be obvious to those skilled in the art and will be more particularly apparent when considered in connection with the accompanying drawings and the following description which serves to explain the principles thereof.

In the drawings:

Fig. 1 is a diagrammatic representation of a control system for a plurality of motors showing the individual motor control system for each motor in accordance with the present invention;

Fig. 2 is a simplified diagrammatic representation of the control system for an individual motor.

Referring now by way of example to the embodiment of the invention, illustrated diagrammatically in the accompanying drawings, a motor 1 has circuit wires 2 and 3 uniting, respectively, to terminals of corresponding switches 4 and 5, which are normally held in open-circuit position by suitable means, as by gravity or by a spring 7. The other terminals of these switches connect to circuit wires or feeder wires 8 and 9, respectively, which correspond to the circuit wires 2 and 3 on the opposite sides of the switches 4 and 5. The switches 4 and 5 are closed and are then held in closed-circuit position by an electromagnet or solenoid 15, which when energized attracts or actuates a rod 16, to which the switches 4 and 5 are pivotally connected in a known manner.

Referring now to the controlling circuits for the magnet or solenoid 15, and describing what may be called for convenience, the first control circuit, a circuit wire 17 connects to the motor circuit wire 9 outside the switch 5. The circuit then passes through the terminals 18 and 19 of an electro-magnetic switch 20, the winding 21 of which is in the motor circuit. This switch and its winding, in this present embodiment, is also utilized in the control for the battery of machines, as will be later described. Wires 22 and 23 connect from the terminal 19 to a spring contact or terminal brush 24. A cooperating brush or spring contact 25 connects to a wire 26, the circuit passing thence through the terminals 27 and 28 of the "stop" switch or buttom 29.

There is also preferably provided in this circuit safety interlocks for the driven machines, although in themselves they form no part of the present invention. There are shown herein a "brake interlock" and a "guard interlock" which would be employed when the control system is applied to a centrifugal machine. In such case, the circuit passes through the terminals 30 and 31 of the brake interlock switch 32, and thence through terminals 33 and 34 of the guard interlock switch 35, and thence by a wire 36 to electro-magnet 15.

The circuit then passes by a wire 37 through terminals 38 and 39 of an electro-magnetic switch 40 (which controls the starting current), the winding 41 of which is in the motor circuit. The circuit passes thence by wire 42 to a terminal 43 and a terminal 44 of an electro-magnetic switch 45 (which controls the running current), the winding 46 of which is likewise in the motor circuit. This circuit passes from terminal 44 by wires 47 and 48 and 70 to a connection with the feeder circuit wire 8 outside the motor circuit switch. This constitutes the momentarily-closed circuit which closes the motor switch 4 and 5, but being only momentarily closed, it cannot keep the motor circuit switch closed.

For the purpose of maintaining the motor circuit switch closed for the desired or predetermined running time, a circuit is provided (which may for convenience be called the second control circuit), which takes current from the motor circuit wire 3 inside the switch 5, and is in shunt relation with the first control circuit from the wire 26 outwardly (that is, back to the feeder circuit). In this circuit the wire 60, as stated, taps the circuit wire 3 inside the switch 5, and goes to the terminal 61 of a switch 62. The other terminal 64 of this switch connects by a wire 63 to the wire 26.

This second control circuit has a portion which is in shunt relation to that part of the circuit already described in which the electro-magnetic switch 45 is located, for the purpose of maintaining the motor running during the high amperage current inrush incident to starting the motor and getting it up to speed, that is, while the magnetic switch 45 is held open by the high amperage due to starting and getting up to speed. In this part of the circuit, a wire 66 starts from the wire 42 and goes to the terminal 67 of the starting switch 68. The other terminal 69 of the starting switch connects by a wire 70 to the circuit wire 8 outside the motor circuit switch 4. The starting switch 68 is held in open-circuit position by any suitable means, such as a compression spring 71, and is manually closed by the attendant.

Means are provided for indicating the position of the electro-magnet switch 45, which controls the running current for the motor, that is, the low-amperage current after the motor has come up to speed. As embodied, this comprises a lamp 76, which glows when the switch 45 is open, that is, during the period of high current consumption when the motor is starting and coming up to speed. This lamp has a circuit wire connection 77 to the motor circuit wire 2, and connects to a terminal 78, which with the terminal 79 cooperates with the switch 45, when it is in the open-circuit position with reference to the electro-magnet 15. Terminals 79 connects by a wire 80 to the motor circuit wire 3.

The manner of operation of the mechanism just described is substantially as follows:—

The mechanism may be regarded as in the position shown in the drawing, when the motor circuit is open and the motor is at rest. The attendant presses the start button 68, and it momentarily closes the circuit between the spring contacts or brushes 24 and 25. The current thereby passes from the circuit wire 9 to the wire 17, through terminals 18 and 19, contacts 24 and 25, and through the series of closed switches, through the electro-magnet 15, and hence through wires 37, terminals 38 and 39, wire 42, terminals 43 and 44 and wire 48 to the circuit wire 8 outside the switch 4, 5.

It may be assumed, merely for example, that a motor is employed which is wound for 20 amperes running load, is used on a load or machine requiring but 12 amperes, but takes for a short time a starting current of about 60 amperes. This represents a practical installation, the motor being able to take for the brief time required the high amperage starting current, as it then has ample opportunity to cool off while running under the subsequent load of 12 amperes. In such case the electro-magnetic switch 40 would be set to open at just about 60 amperes, and the electro-magnetic switch 45 to open just about 12 amperes.

It will be clear, therefore, that when electro-magnet 15 is temporarily energized by the closing of the circuit at 24 and 25, it will immediately close the motor circuit at the switches 4 and 5, and the motor will start running. Due to the high current intake incident to starting, the magnetic switch 45 will immediately open at the terminals 43 and 44, but will close the lamp circuit at the terminals 78 and 79, and the lamp 76 will glow (as shown at the right hand in the drawing) indicating that the holding circuit for electro-magnet 15 is open at this point.

Simultaneously with the foregoing, switch 68 closes the circuit at terminals 67 and 69, and the switch 62 has likewise been closed with switches 4 and 5. The closing of the circuit at terminals 67 and 69 shunts the electro-magnetic switch 45, and the switch 62 shunts the switch 20. The holding current for the electro-magnet 15 passes now from the circuit wire 3, inside the switch 5, through switch 62, wires 63, wire 26, wire 36, the winding of electro-magnet 15, wire 37, wire 66, terminals 67, 68 and through wire 70 to circuit wire 8.

So long as the attendant holds the switch 68 closed, electro-magnet 15 will remain energized, and the motor circuit will be maintained closed and the motor running, irrespective of the high amperage consumed by the motor and notwithstanding that the power current control switch 45 is consequently open. As the motor comes up to speed and the current consumption drops to running condition, in this instance 12 amperes, electro-magnetic switch 45 will close its circuit at the terminals 43 and 44, and the lamp 76 will go out as an indication thereof to the attendant. He now releases the switch 68, but the motor continues to run, as the holding circuit for the electro-magnet 15 is now completed through the terminals 43 and 44.

Under these conditions, the circuit is through the wire 60, switch 62, wire 63, wire 26, wire 36, the winding of electro-magnet 15, wire 37, terminals 38 and 39, wire 42, terminals 43 and 44, wire 48 and wire 70, back to main circuit wire 8. The motor will continue to run until one of the switches 29, 32 or 35 is opened, when electro-magnet 15 will be deenergized and the switches 4 and 5 will be opened and the motor stopped.

The operation of the magnetic switch 40, which controls the starting current for the motor, will be in the usual manner, namely, it remains closed unless the maximum current consumption for which it is set is exceeded. In that event, it will open and deenergize electro-magnet 15, and switches 4 and 5 will be opened and the motor stopped.

Referring now to the means for controlling the starting of the various machines in a battery or group, whereby an attendant is prevented from starting one machines so soon after another as to overload the circuit, it is customary to have a plurality of such machines connected by branch circuits to a feeder, and the loads on the latter and the current consumption are cumulative. Attendants may be instructed to start one machine or a few machines at a time, but the present invention makes certain that this will always be done.

Taking again, by way of example, machines or motors of the capacity already indicated, that is, consuming 60 amperes of starting current and 12 amperes of running current, if five machines were started simultaneously, the feeder load would be 300 amperes, while with four machines running and only one starting, the total feeder load would be only 108 amperes.

It is common practice to fuse the feeder circuits to a predetermined limit of current, or to install circuit breakers which will trip when this limit is reached. Such a system is disadvantageous in that when the circuit breakers trip all the load is taken off the circuit and the shock to the system is practically the same as if a heavy load were suddenly applied. Furthermore, regulation of the generator and of all other feeder circuits is disturbed, and what is usually more serious in delay and annoyance, all machines on the cut out feeder are shut down.

By the present invention there is provided a control system which prevents the addition to a feeder of more than a predetermined load, whereas the circuit breaker or fuse acts only after the excess load has been applied. One of the main advantages of this feature of my invention also is that it prevents any stoppage of other disturbance of the machines already in operation.

The mechanism constituting the present preferred embodiment has already been describe, as it is utilized also in the momentary circuit for energizing any electro-magnet 15. The winding 21 of the electro-magnetic switch 20 is set for a given number of amperes, which would be usually, and by way of example, just below the starting current of any one of the motors.

This mechanism is likewise preferably provided with an indicating signal. As embodied, this comprises a lamp 90, having a circuit wire 91 to the wire 8, and a circuit wire 92 to a terminal 93, which terminal with a terminal 94 cooperates with the electro-magnetic switch in the open position. Terminal 94 connects by a wire 95 to the circuit wire 17. Thus the light 90 will glow so long as any one motor is consuming starting current and is a signal to the attendant not to attempt to start any other motor until the lamp 90 goes out.

Assuming again that the starting current of the motor is 60 amperes, the switch 20 may be set to open at say 55 amperes. When one machine is started, drawing 60 amperes, switch 20 opens the circuit at terminals 18 and 19, but already the holding circuit for this particular electro-magnet had been closed at 67 and 69. However, until the current consumption of this particular motor falls below the setting of switch 20, the switch will remain open. Upon the current so falling the switch 20 will close at terminals 18 and 19, and a second motor can be started.

If the switch were set for 55 amperes, and the second motor was started immediately on the closing of the switch, 60 additional amperes of current would be taken, and the current through the feeder line might jump to 115 amperes as a maximum. The switch 20 would remain open again until the total current consumption had fallen below 55 amperes. Assuming again the example, already referred to, of the five machines, if four machines were running they would consume 12 amperes each, or a total of 48 amperes. The same time the fifth machine could then be switched in and would consume in starting 60 amperes, making a total of 108 amperes, but at no time would the feeder current be above the limit of 115 amperes. It will be seen that the controlling switch has no direct effect upon the line, but controls the current supply to the initial starting buttons circuits of the individual motors, and makes no difference as to the sequence in which the various machines are started.

The invention in its broader aspects is not limited to the specific mechanisms shown and described but departures may be made therefrom within the scope of the accompanying claims without departing from the principles of the invention and without sacrificing its chief advantages.

What I claim is:—

1. In an electric control system for a translating device including an electromagnetically operated main switch, means in the control system normally operable during the starting operation of the device to deenergize the operating means of said main switch until the starting operation is completed and thereafter operable to maintain the switch operating means energized, and manually operated means for actuating the control system to close the main switch including means for initially energizing said switch operating means through the said first means for actuating the switch to close postion and means for thereafter maintaining the switch operating means energized by said manually operated means during the starting operation.

2. In an electric control system for a motor including an electromagnetically operated main switch and a circuit breaker operable during the starting of the motor, manually operated means for actuating the control system to start the motor including means for initially energizing said switch operating means through said circuit breaker, means controlled by said manually operated means for maintaining said switch operating means energized after said circuit breaker has operated, and means operated by said circuit breaker for maintaining the circuit energized after the motor is running at normal load.

3. An electric control system for a motor including an electromagnetically operated main switch, a circuit breaker operable to open position during the starting of the motor, a switch manually operable to closed position to energize said electromagnetically operated main switch through said circuit breaker for starting the motor before said circuit breaker is actuated to open position and thereafter to maintain said main switch in closed position until the motor is operating at normal load current, and means operated by said circuit breaker for maintaining said switch closed after the motor is operating at normal load current.

4. In a motor control system having an electromagnetic main switch for connecting a motor to a source of power, a circuit breaker operable to open position by the motor starting current, a control switch, means operable upon initial movement of said control switch to energize said main switch through said circuit breaker to start said motor, means operable upon further movement of said control switch before the circuit breaker is actuated to open position to render said circuit breaker ineffective during starting, and means for energizing said main switch through said circuit breaker during normal operation of the motor.

5. In a motor starting system, a motor, a source of power, and an electromagnetic main switch for connecting said motor to said source of power for starting the motor, a control circuit for energizing said switch, a control switch operable to two positions which when operated to its first position closes said control circuit to energize said main switch, a switch in said control circuit operable to open position by the motor starting current and means associated with said control switch for shunting said last switch when the control switch is operated to its second position to hold said control circuit closed.

6. In a motor starting system in accordance with claim 5, a signal device operable during the starting of the motor by the switch in the control circuit when said switch is operated to open position by the motor starting current so as to indicate when the motor is running at normal load.

7. In a motor starting system, a motor, a source of power, and an electromagnetic main switch for connecting said motor to said source of power for starting the motor, a control circuit for energizing said switch, a switch in said control circuit operable to open position by motor starting current, a push button switch operative upon initial movement thereof to close said control circuit to energize said main switch through said current responsive switch, contacts on said main switch for maintaining said control circuit energized, and means including switch contacts in shunt to said current responsive switch operative upon further movement of said push button switch to hold said control circuit closed during starting.

In testimony whereof, I have signed my name to this specification.

TANDY A. BRYSON.